(12) United States Patent  (10) Patent No.: US 8,348,194 B2
Guering  (45) Date of Patent: Jan. 8, 2013

(54) CONVEYOR DEVICE INTENDED IN PARTICULAR FOR LUGGAGE IN AN AIRCRAFT HOLD

(75) Inventor: Bernard Guering, Montrabe (FR)

(73) Assignee: Airbus Operations S.A.S., Toulouse (FR)

( * ) Notice: Subject to any disclaimer, the term of this patent is extended or adjusted under 35 U.S.C. 154(b) by 229 days.

(21) Appl. No.: 12/663,793

(22) PCT Filed: Jun. 13, 2008

(86) PCT No.: PCT/FR2008/000822
§ 371 (c)(1), (2), (4) Date: Dec. 9, 2009

(87) PCT Pub. No.: WO2009/007549
PCT Pub. Date: Jan. 15, 2009

(65) Prior Publication Data
US 2010/0170992 A1   Jul. 8, 2010

(30) Foreign Application Priority Data

Jun. 15, 2007 (FR) .................................... 07 04292

(51) Int. Cl.
*B64C 1/20* (2006.01)
*B64C 1/22* (2006.01)
*B64D 47/00* (2006.01)
(52) U.S. Cl. .................... 244/118.1; 198/861.1; 198/435
(58) Field of Classification Search ............... 244/118.1, 244/137.1; 198/435, 369.2, 436, 463
See application file for complete search history.

(56) References Cited

U.S. PATENT DOCUMENTS

| 3,356,236 | A |   | 12/1967 | Shaw et al. |           |
|-----------|---|---|---------|-------------|-----------|
| 3,404,775 | A | * | 10/1968 | McClellan   | 198/369.2 |
| 4,544,319 | A |   | 10/1985 | Folling et al. |        |
| 4,780,043 | A |   | 10/1988 | Fenner et al. |         |
| 4,860,973 | A | * | 8/1989  | Fenner      | 244/137.1 |
| 4,938,336 | A | * | 7/1990  | Aquino et al. | 198/369.2 |
| 5,006,040 | A | * | 4/1991  | Frey        | 414/789.9 |

(Continued)

FOREIGN PATENT DOCUMENTS

BE   679 310   10/1966

(Continued)

OTHER PUBLICATIONS

U.S. Appl. No. 12/597,990, filed Oct. 28, 2009, Guering.
Russian Grant Decision issued May 10, 2012, in Patent Application No. 2010101069 (with English-language translation).

*Primary Examiner* — Rob Swiatek
*Assistant Examiner* — Valentina Xavier
(74) *Attorney, Agent, or Firm* — Oblon, Spivak, McClelland, Maier & Neustadt, L.L.P.

(57) ABSTRACT

A device intended for a hold that can receive containers and luggage simultaneously. The hold includes a freight loading system including rollers defining a rolling surface on which a container can move with the movement of the rollers. The device includes a unit including conveyor belts disposed longitudinally in the hold one after the other such as to extend over at least part of the length of the hold. Each conveyor belt includes an upper section configured to receive an object to be moved and each conveyor belt can move between a first raised position in which the upper section of the belt is located above the rolling surface defined by the rollers of the freight loading system and a second position in which the upper section of the belt is located below the rolling surface.

9 Claims, 4 Drawing Sheets

U.S. PATENT DOCUMENTS

Figure 1:
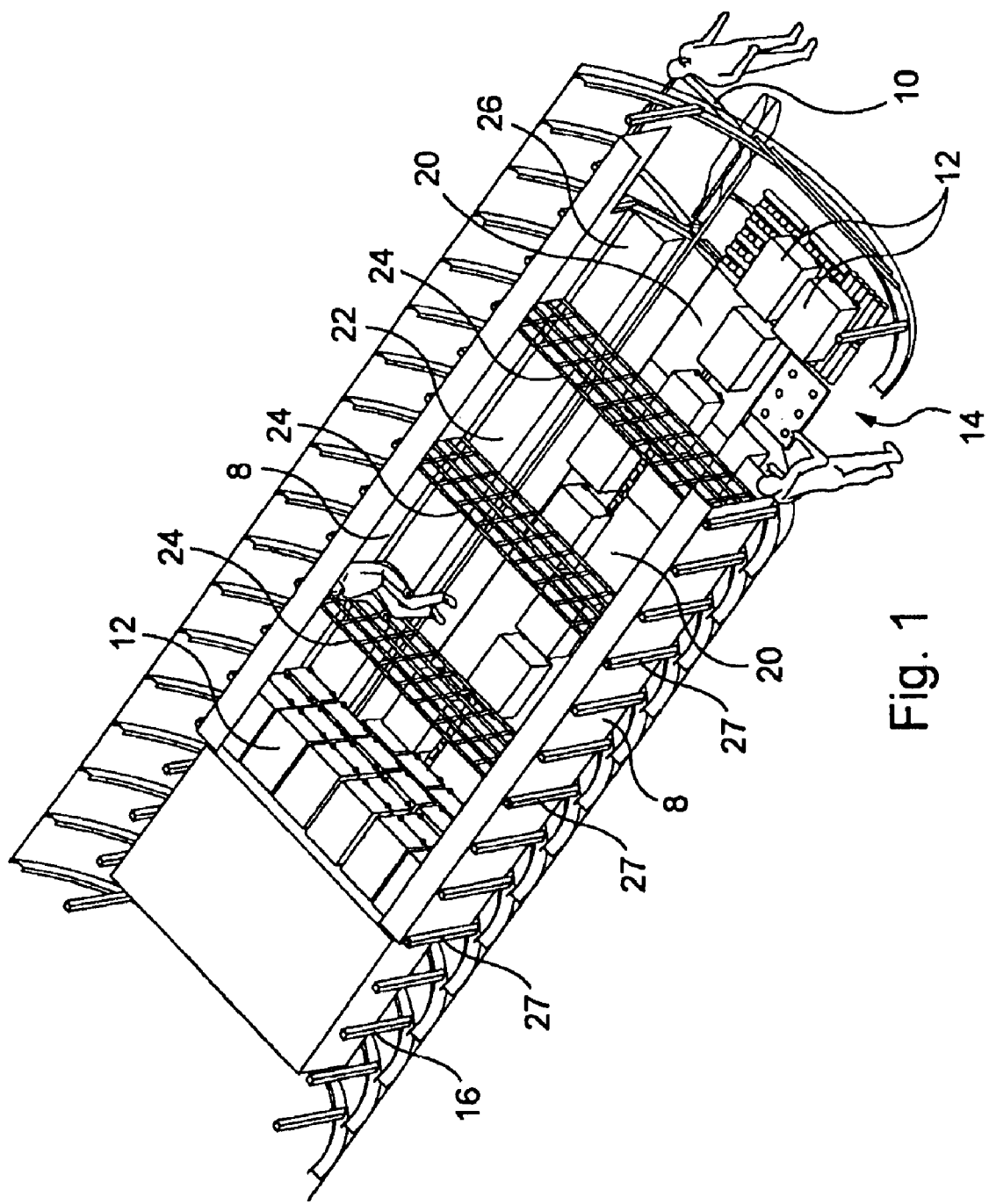

| | | | |
|---|---|---|---|
| 5,715,930 A * | 2/1998 | Hogenkamp | 198/435 |
| 5,961,274 A * | 10/1999 | Bors | 414/791 |
| 6,514,072 B1 * | 2/2003 | Bencic | 432/8 |
| 6,659,704 B2 * | 12/2003 | Fukuhara et al. | 414/398 |
| 6,708,813 B2 * | 3/2004 | Takahashi | 198/369.2 |
| 8,002,513 B2 * | 8/2011 | Malenke et al. | 414/790.5 |
| 2009/0159743 A1 | 6/2009 | Guering et al. | |

FOREIGN PATENT DOCUMENTS

| | | |
|---|---|---|
| RU | 2 083 435 C1 | 7/1997 |

\* cited by examiner

CONVEYOR DEVICE INTENDED IN PARTICULAR FOR LUGGAGE IN AN AIRCRAFT HOLD

This invention relates to a conveyor device, intended in particular for baggage in a hold of an aircraft.

In an aircraft intended for the transport of passengers, the passengers carry a portion of their baggage along with them in the cabin of the aircraft, while the bulkier and heavier baggage travels in the hold. The latter baggage is transported to the aircraft with the aid of conveyors or on towed carts. There are conveyors making it possible to transport baggage up to the door of the hold of the aircraft. Placement inside the hold usually is performed manually. An operator grasps the bag arriving in the hold and goes to put it inside the latter. These operations for placing baggage in the hold are laborious. The hold is a relatively cramped space in which most of the time it is not possible to stand upright. Furthermore, certain bags can be heavy. Going to place the first bags at the back of the hold during loading of the baggage or else, during unloading of the baggage, going to look for the bags located at the back of the hold in order to remove them, is the most difficult.

All these difficulties in arranging baggage in the hold and removing it therefrom make the time for loading and unloading of the passengers' baggage relatively long. The passengers, after getting off the aircraft, then have to wait for their baggage in the air terminal. For this reason, many passengers prefer to carry their bags, even some relatively bulky ones, along with them in the cabin, rather than have them travel in the hold.

To encourage the passengers to have their baggage travel in the hold, and to free up the cabin space, thus making it possible to enhance the comfort of the passengers during their trip and on boarding/deplaning, it is advisable to limit the waiting time for retrieval of the baggage having traveled in the hold.

This invention then has as a purpose to provide a device making it possible to facilitate the task of the operators given the job of placing baggage in an aircraft hold and unloading this hold.

Another purpose of the invention is to provide means making it possible to unload the hold of an aircraft more rapidly in order to limit, or even eliminate, the waiting time for baggage when the passengers come to the air terminal upon their arrival.

Advantageously, the system according to the invention is a modular system that can be adapted to a hold accommodating both containers and baggage. Preferably, this device will make it possible to adapt the space provided for baggage in the hold according, in particular, to the number of containers to be transported.

To this end, this invention proposes a conveyor device for objects, particularly baggage, in an aircraft hold intended to accommodate both containers and baggage and equipped with a cargo loading system having rollers defining a rolling plane on which a container can be moved by causing the said rollers to roll.

According to this invention, this device comprises a set of conveyor belts arranged longitudinally in the hold one after the other so as to extend over at least part of the length of the hold; each conveyor belt comprises an upper section intended to accommodate an object in order to move it; each belt can move between a first raised position in which the upper section of the said belt is located above the rolling plane defined by the rollers of the freight loading system and a second position in which the upper section of the said belt is located below the said rolling plane.

In this way, when containers are loaded or unloaded, the conveyor belts are lowered in order to allow the containers to pass without hindering them. When the containers are in place at the back of the hold, the baggage can be loaded and unloaded. The conveyor belts make it possible to carry the baggage along from a zone near a loading door of the hold toward the back of the hold. As the loading progresses, the conveyor belts are lowered and their advance is halted. Likewise, during unloading, belts pass progressively in raised position and are started up in order to make it possible to convey the baggage up to the vicinity of a door of the hold.

In a preferred embodiment, the conveyor device for objects according to the invention comprises two sets of conveyor belts arranged longitudinally in the hold one after the other so as to extend over at least part of the length of the hold, the two sets being arranged parallel opposite one another, being separated from one another by the rollers of the cargo loading system. This variant is suitable for most cargo loading systems and moreover makes it possible to increase the flow of baggage transported by the conveyor device according to the invention.

The conveyor belts of the same set advantageously are of the same length and arranged according to a predetermined distance. This distance preferably corresponds to the distance that separates two containers in the hold. In this way, if it is desired to increase the number of containers transported in the hold, one conveyor belt for each set of conveyor belts simply is lowered and a container comes to be positioned above the lowered belt(s).

In order to ensure the raising of the conveyor belts and lowering thereof, one embodiment of this invention provides that each conveyor belt comprises an endless belt mounted around two end rollers, that the two end rollers are parallel and mounted on arms pivoting in relation to the hold, each arm associated with an end roller forming a parallelogram with an arm of the other end roller.

In order to be able to cooperate with a device for automatic loading and unloading of baggage outside the hold, the conveyor device for objects according to this invention is implemented in such a manner that a conveyor belt arranged at one end of a set of conveyor belts can be tilted in relation to the adjacent conveyor belt.

This invention also relates to a conveyor device for objects such as described above and which further comprises a cargo loading system.

This invention also has as an object an aircraft comprising a hold, characterized in that the hold is equipped with a conveyor device for objects such as described above. In such an aircraft, the hold preferably comprises at least two access doors each arranged more or less at the end of a set of conveyor belts; a first door is of sufficient size to allow introduction of a container of standardized size into the hold, and a second door, of smaller size in relation to the first door, is positioned in the wall of the hold opposite the wall on which the first door is located. The first door, even if it is more specifically intended for the entry and exit of containers, also can be used for the loading and unloading of baggage.

In a preferred variant, facilitating the conveying of objects such as baggage, between the two access doors of the hold of the aircraft, at the end of at least one set of conveyor belts, the hold comprises a conveyor component making it possible to carry out moving of an object in two perpendicular directions, a first direction corresponding to the direction of movement of an object located on the set of conveyor belts and the second direction being a perpendicular direction corresponding to a direction transverse in relation to the aircraft.

Figure 2:
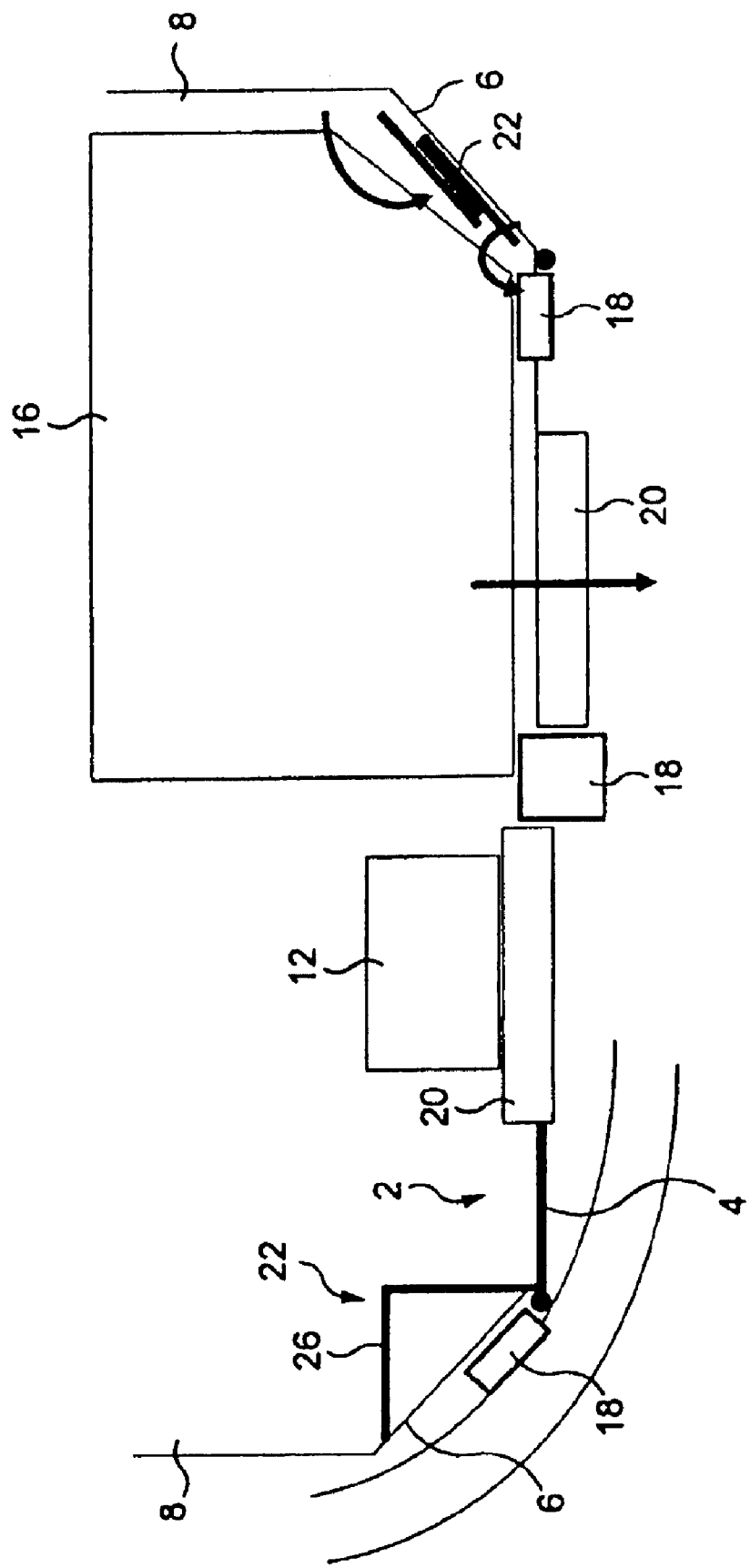

Details and advantages of this invention will become more apparent from the description that follows, presented with reference to the attached schematic drawings on which:

FIG. 1 shows an aircraft hold equipped with a conveyor device according to this invention, FIG. 2 is a schematic front view of a hold equipped with a conveyor device according to this invention, the left portion of this Figure partially showing a conveyor device according to this invention used to move baggage, and the right portion of this Figure shows a similar conveyor device during the positioning of a container.

Figure 4:
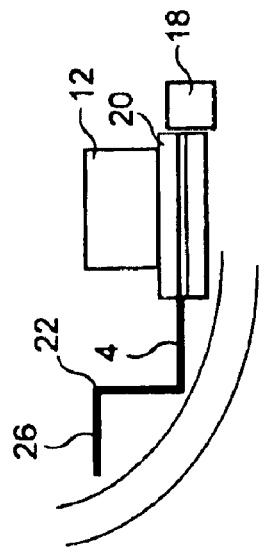
Figure 6:
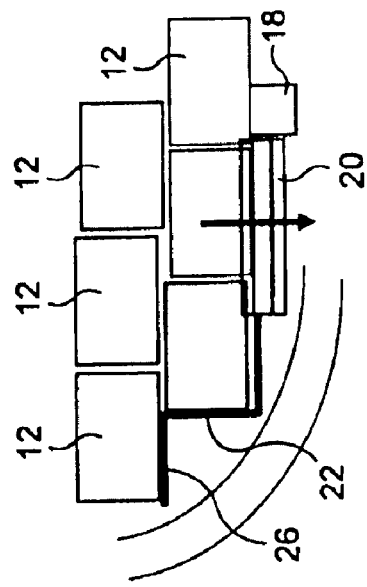
Figure 3:
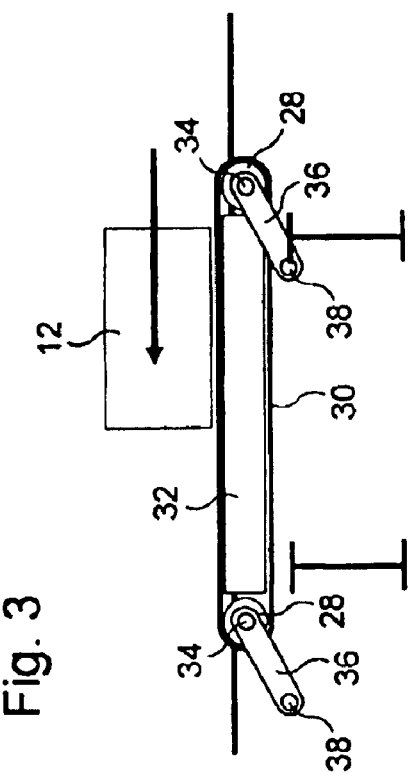
Figure 5:
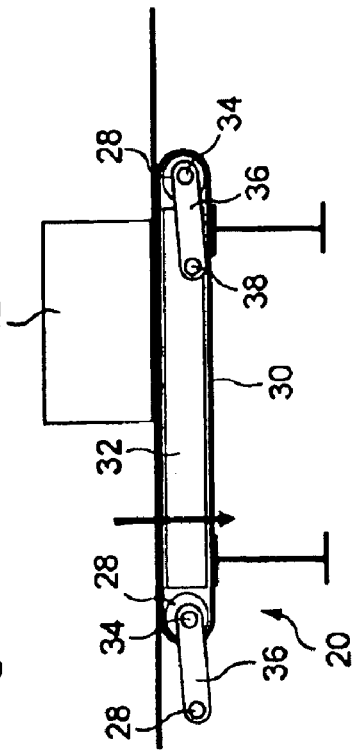
Figure 8:
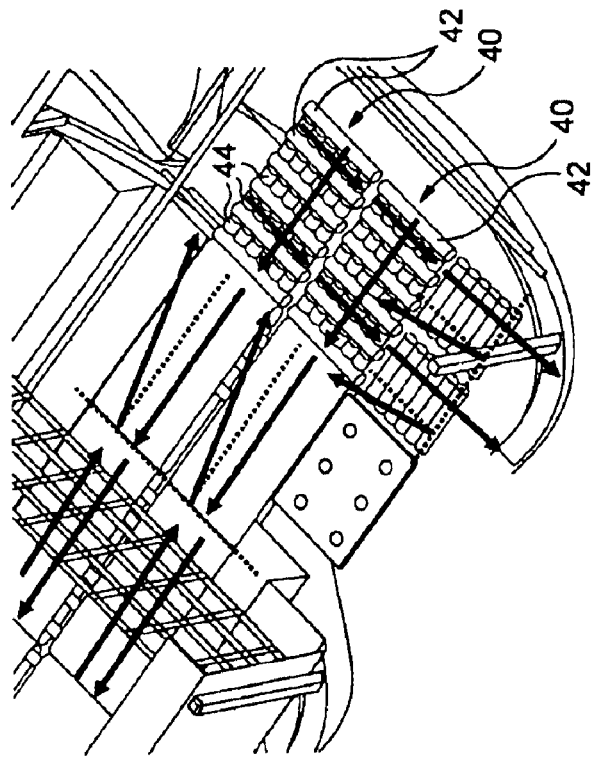
Figure 7:
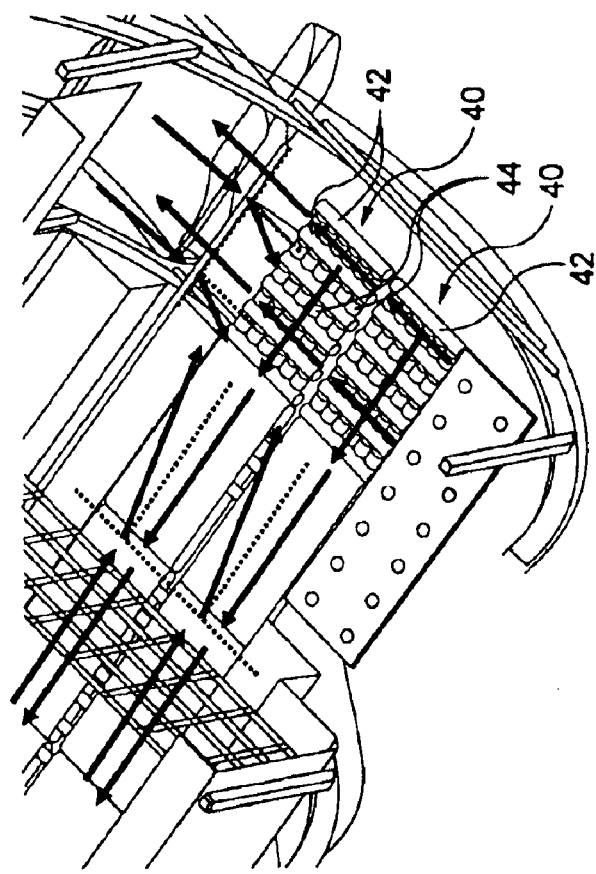

FIG. 3 is a schematic side view of a belt of a conveyor device according to this invention in raised position, FIG. 4 is a front view of the conveyor belt of FIG. 3, FIG. 5 schematically shows the conveyor belt of FIG. 2 in lowered position, FIG. 6 is a front view of the conveyor belt of FIG. 5, FIG. 7 is a view illustrating the loading and unloading of baggage via a first door of the hold of the aircraft, and FIG. 8 is a view illustrating the loading and unloading of baggage via a second door of the hold of the aircraft, The description that follows is presented with reference to an aircraft intended in particular for the transport of passengers. FIG. 1 shows a hold of such an aircraft.

A hold floor 2 is seen on FIGS. 1 and 2. This floor is implemented in three parts: a more or less horizontal central part 4 and two raised side parts 6, inclined in relation to the central part 4. Of course, the references to horizontality and verticality in this patent application relate to the aircraft described when it is on the ground.

The hold also has more or less vertical side walls 8 which define the loading space of the hold. The ceiling thereof is not visible here.

The hold shown on FIG. 1 comprises as access, on the one hand a baggage door 10 intended in particular for the loading and unloading of baggage 12, and on the other hand a container door 14. The latter is of sufficient size to allow, for example, the passage of a standardized container 16 of LD3 type.

The hold shown on FIG. 1 is equipped with a cargo loading system, also known under the name of CLS (English abbreviation for Cargo Loading System). The latter is provided for the movement of containers 16 in the hold. The latter are loaded and unloaded via container door 14. The cargo loading system comprises in particular rollers 18 on which containers 16 moving in the hold come to slide. Rollers 18 define a rolling plane on which containers 16 move. The latter are introduced into the hold via container door 14 and pushed inside the hold. The cargo loading system makes it possible to easily move containers 16 toward the back of the hold in order to allow introduction of other containers. Locking systems, not shown, make it possible to keep containers 16 at the back of the hold during a flight. Such loading and locking systems are known to the individual skilled in the art and are not described in further detail here.

In the example of FIG. 1, a container 16 is located at the back of the hold and the remainder of the hold is intended to accommodate baggage 12. For loading of the hold, baggage 12 is introduced into the hold, for example, via baggage door 10. Innovative means then are provided for moving this baggage 12 toward the back of the hold.

The means employed here comprise two identical sets of conveyor belts 20. Conveyor belts 20 of one set are aligned one behind the other in the longitudinal direction of the aircraft on central part 4 of floor 2 of the hold. Between the two sets of conveyor belts 20, there is located a row of rollers 18 of the cargo loading system.

These conveyor belts 20 each make it possible to move one (or more) bag(s) placed on them longitudinally in the hold of the aircraft. In this way a set of conveyor belts 20 makes it possible to move a bag 12 from the first conveyor belt situated closest to baggage door 10 up to the last conveyor belt situated at the other end of the set of conveyor belts (20) by passing from one conveyor belt to the other.

It thus is provided to place baggage 12 on the first conveyor belt of each of the sets of conveyor belts 20. This baggage 12 then is moved toward the back of the hold. An operator located at the back of the hold then arranges the baggage that he receives in order to form a wall of baggage, as shown on FIG. 1. Preferably one operator is provided per set of conveyor belts 20.

In order to facilitate the task of the operators placing the baggage at the back of the hold, benches 22 are provided at inclined side parts 6 of floor 2. These benches preferably are folding so as not to hinder the passage of containers 16. These benches 22 also can be used to hold baggage 12. In fact, instead of having baggage 12 rest on the inclined parts of floor 2 of the hold, this baggage is placed on benches 22 which preferably have a sitting surface 26 more or less horizontal and parallel to central part 4 of floor 2 of the hold. In that way, the arranged stacking of the baggage is more stable.

Conveyor belts 20 can be controlled individually. Thus on FIG. 1, the conveyor belt located farthest to the back of the hold of each set of conveyor belts and on which a wall of baggage 12 is located preferably is stopped. In this way, rubbing between the said conveyor belts and the baggage located at the bottom of the wall of baggage is avoided.

As loading progresses, the baggage forms walls of baggage. In order to secure this baggage and prevent it from falling down, it is provided to hang nets 24 crosswise in relation to the hold. These nets 24 preferably are rolled up on props 27 located at side walls 8. These props 27 connect the floor of a cabin located above the hold to a primary structure of the aircraft. Sections of components (generally called "framework" or "frame") of this primary structure on which props 27 come to rest are seen on FIG. 1.

Each net 24 preferably is arranged at two props 27 corresponding to the same framework of the primary structure of the aircraft. A winding mechanism then is mounted on two corresponding props 27. A slot made in corresponding side wall 8 facing a prop 27 allows passage of net 24. A sheathing, not shown, is provided around the winding mechanism to achieve watertightness around the latter and thus to ensure continuity of the side wall. Each winding mechanism accommodates, for example, one half-net 24. These half-nets then are pulled by the operators from each winding mechanism and meet in the center of the hold and are fastened together with the aid of hooks or other joining devices.

FIG. 2 is a schematic front view showing on one portion the conveying of a bag 12 and on the other portion the movement of a container 16, for example a standardized container of LD3 type.

On the left portion of FIG. 2, there is seen in particular a conveyor belt 20, rollers 18 of the cargo loading system, a part of the structure of the hold with its floor as well as a retractable bench 22.

Conveyor belt 20 is here (on the left portion of FIG. 2) in its active position. The upper section of the belt is located above the plane on which rolling of a container 16 takes place: this plane corresponds to the plane passing through the upper edges of rollers 18 or else the bottom of a container 16 moving by rolling on these rollers 18 (cf. right portion of FIG. 2). Conveyor belt 20 then can transport a bag 12 without being hindered by the cargo loading system of the hold.

It is seen on the left portion of FIG. 2 that bench 22 is in its use position. It thus has a sitting surface 26 more or less horizontal or, expressed differently, parallel to central part 4 of floor 2 of the hold.

On the right portion of FIG. 2, conveyor belts 20 are inactive and rollers 18 of the cargo loading system are used for movement of a container 16 of LD3 type. As regards bench 22, it is retracted.

Conveyor belts 20 here are in their lowered position. The upper section of each of these belts is located below the rolling plane defined above. Container 16 can pass without being hindered by conveyor belts 20. Conveyor belts 20 also assume this position when they are supporting a wall of baggage 12. The construction of these conveyor belts 20 enables them to bear a substantial load and solid supports on the primary structure of the aircraft are provided to accommodate each conveyor belt 20 in its lowered position.

Bench 22 here is retracted in order not to hinder the passage of container 16. This bench 22 is not useful during loading or unloading of containers 16. It therefore is not bothersome since it is folded back.

For a better modularity of the hold, that is, in order to allow the hold to accommodate a variable number of containers 16 and to adapt the space to accommodate baggage 12, it is advantageous that the length of a conveyor belt 20, or more precisely the distance between two conveyor belts 20, corresponds to the width of a container 16 adapted to the hold (the length of conveyor belt 20 and the width of a container 16 are each measured in the longitudinal direction of the aircraft). Thus when several containers 16 are loaded on board the hold, conveyor belts 20 located beneath containers 16 remain in lowered position and other conveyor belts 20 ensure conveyance of the baggage 12 up to containers 16.

Likewise, several benches 22 preferably are provided on each side of the hold. Here also, measured in the longitudinal direction of the aircraft, the length of a bench 22 is a multiple of the width of a container 16. Advantageously, a bench has a length corresponding to double the width of a container 16. In this way, the deployment and folding of benches 22 is accomplished more rapidly than for benches the length of which corresponds to the width of a single container.

FIGS. 3 to 6 illustrate the passage of a conveyor belt 20 from its active position (FIGS. 3 and 4) to its retracted position (FIGS. 5 and 6) or vice versa.

There is seen on these Figures the structure of a conveyor belt 20. The latter comprises two end rollers 28 around which an endless band 30 is positioned. A core 32 is arranged inside the endless belt 30, between end rollers 28, to support the load transported during a conveyance as well as when conveyor belt 20 is in lowered position and bears several bags. The motor or motors, not shown on the drawings, for driving end rollers 28 can, for example, be housed in core 32.

Each end roller 28 is mounted around a shaft 34. Each shaft 34 is borne by two pivoting arms 36, one on each side of end roller 28. Pivoting arms 36 corresponding to the same end roller 28 are mounted on a motorized axle 38. Pivoting arms 36 are, for example, keyed on axle 36 and when axle 36 is driven in rotation, the corresponding arms pivot carrying with them the corresponding end roller 28. The height of the latter varies, thus making it possible to have a conveyor belt 20 pass from an active position to a retracted position, or vice versa.

On the same side of a conveyor belt 20, the two pivoting arms 36 form a parallelogram during passage from the retracted position to the active position, or vice versa. In that way, conveyor belt 20 still remains more or less horizontal.

Generally speaking, except for the conveyor belt located at the end of a set of conveyor belts 20 on the baggage door 10 side, the two axles 38 of the same conveyor belt 20 can be connected and driven by the same motor.

As illustrated in particular on FIGS. 7 and 8 which illustrate the loading and unloading of baggage 12, the end of conveyor belt 20 closest to baggage door 10 advantageously can be raised in relation to the other conveyor belts located in their active position.

On FIG. 7, first arrows show the advance of baggage during loading of the hold while second arrows show the advance of baggage during unloading of the hold.

There is seen on FIGS. 7 and 8, at the end of each set of conveyor belts 20, the presence of a conveyor component 40 making it possible to carry out movement of a bag in two perpendicular directions, a first direction corresponding to the longitudinal direction corresponding to the movement of a bag located on the set of conveyor belts 20 and the second direction being a perpendicular direction corresponding to a direction transverse in relation to the aircraft.

Each conveyor component 40 has two first rollers 42 allowing a longitudinal movement of a bag. These first rollers 42 therefore extend crosswise in relation to the hold (or to the aircraft). Each conveyor component 40 also has second rollers 44 allowing a transverse movement of a bag. These second rollers 42 thus extend longitudinally in relation to the hold. These various rollers are motorized. Depending on the conveying direction selected, first rollers 42 are raised or lowered in relation to second rollers 44 which, for example, are fixed.

During loading of baggage in the hold, the baggage arrives with a more or less transverse movement in relation to the aircraft via baggage door 10 (FIG. 7) or via container door 14 (FIG. 8) to then be guided with a longitudinal movement toward the back of the hold of the aircraft. Generally speaking, just before making a change of direction, it is necessary to raise a belt (or other conveyor means). This is shown on FIGS. 7 and 8 by an arrow associated with dotted lines. The latter symbolize a more or less horizontal plane while the unbroken-line arrow indicates the upward slant of conveyor belt 20 or of means for conveying baggage.

As is apparent from the preceding description, the conveyor device for baggage according to the invention is adapted just as well to a hold accommodating only baggage as to a hold intended to accommodate both baggage and containers. The device according to the invention can be adapted to a number of configurations. The number of containers carried along in the hold can be variable. The device then adapts fully to the available space.

The proposed device spares the personnel given the job of placing the passengers' baggage in the hold of the aircraft from carrying (or throwing) the baggage toward the back of the hold. The baggage can be moved by a belt or other means into the hold, where it is guided—automatically—on conveyor belts 20 toward the back of the hold. Operators at the back of the hold receive the baggage and stack it. As loading progresses, conveyor belts are lowered and stopped.

The device according to the invention also makes it possible to save considerable time in the loading and unloading of baggage.

The conveyor belts proposed here have a limited extra load for the aircraft. In that way, the weight of the device does not burden the overall weight of the aircraft too heavily.

Of course, this invention is not limited to the preferred embodiment described above by way of non-limitative example. It also relates to all the embodiment variants within the capacity of the individual skilled in the art in the context of the claims below.

The invention claimed is:

1. A conveyor device for objects, or for baggage, in an aircraft hold configured to accommodate both of containers and the objects or baggage, the device comprising:
   a cargo loading system including rollers, upper edges of the rollers defining a rolling plane on which a container is movable by causing the rollers to roll; and
   a set of conveyor belts arranged longitudinally in the hold one after the other so as to extend over at least part of the length of the hold,
   each conveyor belt includes an upper section configured to accommodate an object to move the object,
   each conveyor belt is movable between a first raised position in which the upper section of the conveyor belt is located above the rolling plane and a second position in which the upper section of the conveyor belt is located below the rolling plane, and
   the rollers are configured to contact the container at the rolling plane and to move the container when the conveyor belt is in the second position so that a bottom surface of the container is separated by a vertical gap from the upper section of the conveyor belt.

2. A conveyor device for objects according to claim 1, comprising two sets of conveyor belts arranged longitudinally in the hold one after the other so as to extend over at least part of the length of the hold, the two sets being arranged parallel opposite one another, being separated from one another by rollers of the cargo loading system.

3. A conveyor device for objects according to claim 1, wherein conveyor belts of the same set are of the same length and arranged according to a predetermined distance.

4. A conveyor device for objects according to claim 1, wherein each conveyor belt includes an endless belt mounted around two end rollers, and the two end rollers are parallel and mounted on arms pivoting in relation to the hold, each arm associated with an end roller forming a parallelogram with an arm of the other end roller.

5. A conveyor device for objects according to claim 1, wherein a conveyor belt arranged at one end of the set of conveyor belts is tiltable in relation to an adjacent conveyor belt.

6. A conveyor device for objects according to claim 1, further comprising a cargo loading system.

7. An aircraft comprising a hold, wherein the hold includes a conveyor device for objects according to claim 1.

8. An aircraft according to claim 7, wherein the hold includes at least two access doors each arranged substantially at an end of a set of conveyor belts, a first door is of sufficient size to allow introduction of a container of standardized size into the hold, and a second door, of smaller size in relation to the first door, is positioned on the wall of the hold opposite the wall on which the first door is located.

9. An aircraft according to claim 8, wherein between the two access doors, at an end of at least one set of conveyor belts, the hold includes a conveyor component making it possible to carry out movement of an object in first and second perpendicular directions, the first direction corresponding to the direction of movement of an object located on the set of conveyor belts and the second direction being a perpendicular direction corresponding to a direction transverse in relation to the aircraft.

* * * * *